United States Patent Office 3,291,798
Patented Dec. 13, 1966

3,291,798
(2-TERTIARY AMINO ETHYL)-HYDROQUINONES, LOWER ALKANOYL DERIVATIVES THEREOF AND PROCESSES FOR THEIR PRODUCTION
Louis L. Skaletzky, Kalamazoo, Mich., assignor to The Upjohn Company, Kalamazoo, Mich., a corporation of Delaware
No Drawing. Filed Feb. 25, 1964, Ser. No. 347,116
6 Claims. (Cl. 260—268)

This invention pertains to novel organic chemical compounds, and to a process for preparing the same. More particularly, the invention is directed to novel 2-amino-2,3-dihydro-3-substituted-5-benzofuranols, (2-aminoethyl) hydroquinone hydrogenolysis products thereof, and a process which comprises condensing a (1-alkenyl)amine and p-benzoquinone to produce the novel 2-amino-2,3-dihydro-3-substituted-5-benzofuranols, and hydrogenolysis of the 2-amino-2,3-dihydro-3-substiuted-5-benzofuranols to produce the novel (2-aminoethyl)-hydroquinones.

The novel 2-amino-2,3-dihydro-3-substituted-5-benzofuranols of this invention have, in their free base form, the structural formula:

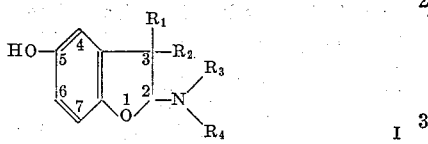

wherein $R_1$ is selected from the group consisting of hydrogen, lower-alkyl, and phenyl; $R_2$ is selected from the group consisting of lower-alkyl and phenyl; $R_3$ and $R_4$ taken separately are selected from the group consisting of lower-alkyl, phenyl, and substituted phenyl selected from the group consiting of lower-alkylphenyl, lower-alkoxyphenyl, and halophenyl, provided that $R_3$ and $R_4$ are not simultaneously selected from phenyl and substituted pheny; and $R_3$ and $R_4$ taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

The novel (2-aminoethyl)hydroquinone hydrogenolysis products of this invention have, in their free base form, the structural formula:

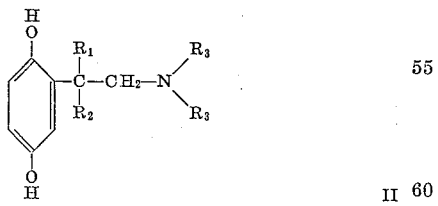

whereinin $R_1$, $R_2$, $R_3$ and $R_4$ are as defined above.

The novel free base compounds of Formulas I and II can be reacted with acids to form novel acid addition salts. The thus-formed acid addition salts are useful compounds in accordance with the invention and are, therefore, contemplated as an embodiment of the invention.

The hydroxyl groups of the novel compounds of Formulas I and II can be acylated to form novel esters. The thus-formed esters are useful compounds in accordance with the invention, and are also contemplated as an embodiment thereof. The free base esters of the invention can be represented by the structural formulas:

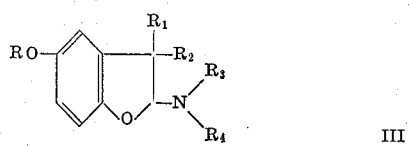

and

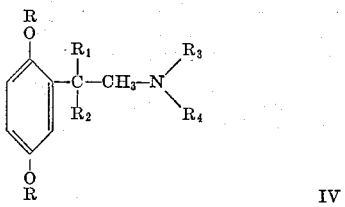

wherein $R_1$, $R_2$, $R_3$ and $R_4$ are as defined above and R is lower-alkanoyl. The esters of Formulas III and IV also form acid addition salts according to the invention.

As employed herein, the term "lower-alkanoyl" means the acyl group of any alkanoic acid of from 1 to 6 carbon atoms, inclusive, for example, formyl, acetyl, propionyl, butyryl, valeryl, caproyl, and the isometric forms thereof. The term "lower-alkyl" includes methyl, ethyl, propyl, butyl, pentyl, hexyl, and the isomeric forms thereof. The term "lower-alkoxy" includes methoxy, ethoxy, propoxy, butoxy, and the isomeric forms thereof. The term "halophenyl" includes, for example, o-fluorophenyl, p-bromophenyl, 3,5-dichlorophenyl, 3,4,5-tribromophenyl, m-iodophenyl, o-chlorophenyl, and the like. And finally, the term "saturated heterocyclic amino radical

of from 5 to 7 nuclear atoms, inclusive," includes, for example, pyrrolidino, 2-methylpyrrolidino, 2-ethylpyrrolidino, 2,2-dimethylpyrrolidino, 3,4-dimethylpyrrolidino, 2-isopropylpyrrolidino, 2-sec.-butylpyrrolidino, and like alkylpyrrolidino groups, morpholino, 2-ethylmorpholino, 2 - ethyl - 5-methylmorpholino, 3,3-dimethylmorpholinothiamorpholino, 3 - methylmorpholino, 2,3,6-trimethyl- morpholino, 4-methylpiperazino, 4-butyl-piperazino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethylenimino, 2-methylhexamethylenimino, 3,6-dimethylhexamethylenimino, homomorpholino, and the like.

The novel compounds of this invention are useful for a variety of purposes. For example, the free base compounds of Formulas I, II, III, and IV can be reacted with fluosilicic acid to form amine fluosilicate salts in accordance with U.S. Patents 1,915,334 and 2,075,359. The amine fluosilicate salts thus obtained are effective as mothproofing agents. The same free base compounds also form salts with thiocyanic acid, which salts can be condensed with formaldehyde in accordance with U.S. Patents 2,425,320 and 2,606,155 to form amine thiocyanate-formaldehyde condensation products for use as pickling inhibitors.

The compounds of Formulas I and II are otherwise useful as intermediates for reaction with phosgene to produce the corresponding chloroformates which in turn are reacted with ammonia, monomethylamine, dimethylamine, or other primary or secondary amines to produce corresponding carbamates useful as insecticides. Insecticidal carbamates can also be prepared by reacting the compounds of Formula I and II with isosyanates such as methyl isocyanate, ethyl isocyanate, and the like.

In accordance with a preferred embodiment of the invention the compounds of Formulas I, II, III, and IV wherein $R_3$ and $R_4$ taken together with $-\text{N}{<}$ constitute saturated heterocyclic amino radical

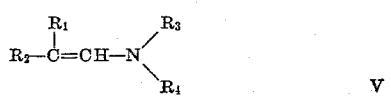

as defined above) have been found to be pharmacologically effective as inhibitors of pseudocholinesterase, and they can be used as central nervous stimulants in mammals, birds, and other animals. More particularly, the heterocyclic amino compounds of Formulas I, II, III, and IV and their pharmacologically acceptable acid addition salts are useful for alleviating mental depression.

All the 2-amino-2,3-dihydro-3-substituted-5-benzofuranol compounds of Formula I are inherently useful as intermediates for preparing the (2-aminoethyl)hydroquinone hydrogenolysis products of Formula II.

The novel 2-amino-2,3-dihydro-3-substituted-5-benzofuranols of this invention (compounds of Formula I) are prepared by condensing a (1-alkenyl)amine of the formula:

$$R_2-\underset{\underset{R_1}{|}}{C}=CH-N\underset{\diagdown R_4}{\diagup R_3} \qquad V$$

wherein $R_1$, $R_2$, $R_3$, and $R_4$ are as defined above and p-benzoquinone, advantageously in the presence of an inert solvent and under substantially anhydrous conditions. It is preferred to employ about equimolar amounts of the reactants, although an excess of the (1-alkenyl)amine can be employed if desired. The condensation reaction is exothermic, and the reaction mixture undergoes an initial evolution of heat. In some circumstances, depending somewhat on quantities and concentration of reactants and rate of mixing, the temperature of the reaction mixture will reach the boiling temperature. After the initial reaction subsides, the reaction is completed at about 25° C.; although it can also be completed at temperatures higher than 25° C. if desired, such as up to about 80° C. or even higher. Ordinarily, satisfactory yields are obtained after about 15 hrs. to about 48 hrs. at about 25° C.; but if desired, longer reaction times can be employed. Since the reaction is sometimes vigorously exothermic, it is often preferred to mix the reactants at a temperature in the range about 4° to about 10° C. and then permit the reaction mixture to warm to about 25° C. for completion of the reaction. Suitable inert solvents for the reaction include benzene, ethyl acetate, toluene, hexane, ether, tetrahydrofuran, dioxane, chloroform, carbon tetrachloride, acetonitrile, and the like.

The 2-amino-2,3-dihydro-3-substituted-5-benzofuranols usually separate from the reaction mixture as solids and are recovered by filtration. The product can be further purified by conventional methods such as washing, and recrystallization from suitable solvents.

The novel (2-aminoethyl)hydroquinones of this invention (compounds according to Formula II) are prepared by hydrogenolysis of the 2-amino-2,3-dihydro-3-substituted-5-benzofuranols of Formula I. In general, the hydrogenolysis is preferably effected in the presence of a hydrogenation catalyst, e.g., platinum or palladium supported on carbon or alumina according to conventional methods, illustratively, in a system comprising (1) hydrogen gas at about 15 lbs. to about 60 lbs. per sq. in. pressure, (2) the catalyst, (3) temperatures in the range of about 10° C. to about 100° C. (preferably about 25° C.), and (4) an inert solvent. Representative inert solvents include glacial acetic acid, methanol, ethanol, ethyl acetate, and the like.

The hydrogenolysis reaction proceeds readily and is essentially complete in about 1 hr. to about 2 hours when, for example, platinum catalyst, hydrogen pressures of about 20 to about 50 lbs. per sq. in. and a temperature of about 25° C. are employed. The (2-aminoethyl)hydroquinone product is isolated by removing the catalyst from the reaction mixture by filtration, removing the solvent by evaporation, and crystallizing. Advantageously, the product is isolated in the form of its free base, and purified by recrystallization from suitable solvents such as ether, technical hexane, benzene, ethyl acetate, ethanol, and the like.

Alternatively, hydrogenolysis of the 2-amino-2,3-dihydro-3-substituted-5-benzofuranols of Formula I can be effected with lithium aluminum hydride. Accordingly, a solution of the compound in an inert organic solvent is treated with lithium aluminum hydride. Suitable inert organic solvents include tetrahydrofuran, diethyl ether, dibutyl ether, diisopropyl ether, N-ethylmorpholine, and the like. After the reaction is completed, the reaction mixture is decomposed, e.g., by careful addition of an aqueous acid (e.g., hydrochloric acid) and the aluminum salts solubilized with, for example, sodium potassium tartrate. The decomposed mixture is then extracted with a water-immiscible solvent such as chloroform, ethylene chloride, diethyl ether, and the like, and the solvent is removed by evaporation to obtain the desired (2-aminoethyl)hydroquinone of Formula II. The compounds can be purified by conventional means such as recrystallization.

The esters of Formulas III and IV are prepared from the 2-amino-2,3-dihydro-3-substituted-5-benzofuranols and (2-amino-ethyl)hydroquinones of Formulas I and II, respectively, by using procedures conventional in the art for converting phenols to their alkanoic acid esters such as: (1) acid-catalyzed esterification of the phenol with an alkanoic acid, e.g., formic acid, acetic acid, propionic acid, butyric acid, isobutyric acid, valeric acid, caproic acid, and the like; (2) treatment of the phenol with an alkanoyl halide, e.g., acetyl chloride, acetyl bromide, propionyl chloride, butyryl chloride, isobutyryl chloride, valeryl chloride, caproyl chloride, and the like; and (3) treatment of the phenol with an alkanoic anhydride, e.g., acetic anhydride, acetic formic anhydride, propionic anhydride, butyric anhydride, isobutyric anhydride, valeric anhydride, caproic anhydride, and the like. Generally speaking, procedure (3) is somewhat preferred.

The acid addition salts of this invention are obtained by neutralizing the free base compounds of Formulas I, II, III, and IV with an acid by conventional methods. For example, the compounds can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting an acid addition salt of this invention with an acid which is stronger than the acid comprising the acid moiety of the starting salt. Pharmacologically acceptable acid addition salts can be prepared using acids such as sulfuric, hydrochloric, hydrobromic, nitric, phosphoric, benzoic, p-toluenesulfonic, salicylic, acetic, propionic, pamoic, tartaric, citric, succinic acids, and the like. Similarly, acid addition salts can be prepared with acids such as fluorosilicic acid, thiocyanic acid, and the like.

The (1-alkenyl)amine starting compounds of Formula V (many of which are known) are readily prepared by known methods for reacting an aldehyde

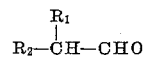

wherein $R_1$ and $R_2$ are as defined above and a secondary amine

wherein $R_3$ and $R_4$ are as defined above. The reaction of the aldehyde and the secondary amine can be effected according to the general method described by Mannich and Davidsen, Ber. 69, 2106 (1936) or the modified Mannich and Davidsen method described by Brannock and Burpitt, J. Org. Chem. 26, 3576 (1961). Another general method particularly adapted to high-boiling secondary amines was described by Stork et al., J. Am. Chem. Soc. 85, 207–222 (1963).

According to the Mannich and Davidsen method one mole of aldehyde and about 2 moles of secondary amine are reacted at about 0° C. in the presence of potassium carbonate and an inert organic solvent. The resulting 1,1-diamine is converted to the desired (1-alkenyl)amine by heating at the reflux temperature, and the (1-alkenyl) amine is recovered by distillation or other conventional methods.

Brannock and Burpitt modified the foregoing method by reacting the aldehyde and the secondary amine in an autoclave. They used about 1.1 moles of potassium carbonate, 500 ml. of xylene, 4 moles of aldehyde, and 4.4 moles of secondary amine and heated the reaction mixture in an autoclave at 100° C. for 4 hours. As soon as the reaction mixture was cool, the liquid portion was decanted and distilled to obtain the (1-alkenyl)amine. They caution that lesser proportions of potassium carbonate or solvent, and permitting the reaction mixture to stand will reduce yields. The foregoing procedures are efficacious even with low-boiling amines such as dimethylamine and diethylamine.

The Stork et al. method is particularly adapted for high-boiling amines such as diisopropylamine, diisobutylamine, N-methylaniline, N-butylaniline, N-isoamylaniline, and the like. According to their method, the aldehyde and secondary amine are heated in the presence of benzene or toluene, and about 1.5 to 2.0 molar equivalents of amine is used per molar equivalent of aldehyde. In some instances p-toluenesulfonic acid is used as a catalyst. The reaction mixture is ordinarily heated at the reflux temperature using a water separator for from about 5 to about 24 hours or until water separation ceases. The (1-alkenyl)amine product is recovered from the reaction mixture by distillation under reduced pressure.

As noted, many of the (1-alkenyl)amine starting compounds required for preparing the novel 2-amino-2,3-dihydro-3-substituted-5-benzofuranols of this invention (compounds according to Formula I) are known in the art. Illustratively, Mannich and Davidsen prepared 1-propenylpiperidine, 1 - (1 - heptenyl)piperidine, 1-(2-methylpropenyl)piperidine, 1 - (1 - butenyl)piperidine, N,N-diethyl - 1 - heptenylamine, N-1-butenyl-N-methylaniline, N,N-diethylstyrylamine, and 1-styrylpiperidine. Further, illustratively, Opitz et al., Ann. 623, 112–117 (1959) prepared 1-propenylpyrrolidine, 1-(3-methyl-1-butenyl)piperidine, N,N-diethyl-1-butenylamine, 1-(2-ethyl-1-butenyl)piperidine, N,N-diethyl - 2 - methylpropenylamine, 4-(1-heptenyl)morpholine, 1-(2-methylpropenyl)pyrrolidine, and 1-(2-ethyl-1-hexenyl)piperidine. Enamines tend to be unstable, particularly in the presence of water. It is good practice, therefore, to store them in the cold under nitrogen unless they are to be used soon after they are prepared.

According to the foregoing described methods other (1-alkenyl)amines according to Formula V can be prepared by employing aldehydes such as 2-ethyloctaldehyde, 2,3-dimethylbutyraldehyde, 2-methylheptaldehyde, 2-butyloctaldehyde, 2-butylhexaldehyde, 2-hexyloctaldehyde, diphenylacetaldehyde, 2-phenylpropionaldehyde, 3-methyl-2-phenylbutyraldehyde, 2-phenyloctaldehyde and like aldehydes; and secondary amines such as dimethylamine, diisopropylamine, diisobutylamine, dihexylamine, p-isopropyl-N-tert.pentylaniline, N-butyl-o-chloroaniline, N-methyl-m-toluidine, N - ethyl - 3,5 - xylidine, N,3-dimethylbutylamine, thiamorpholine, N-isopropylhexylamine, N-isopropyl-p-anisidine, N-ethylaniline, N-hexylaniline, N-ethyl-2-methylpropylamine, and like secondary amines.

PREPARATION 1.—Preparation of 4-(2-methylpropenyl) morpholine

A solution of 52.0 g. (0.6 mole) of morpholine and 36.0 g. (0.5 mole) of isobutyraldehyde in 150 ml. of benzene was heated at the reflux temperature for 3 hours, using a Dean-Stark water separator, during which time 9.0 ml. of water was collected. The benzene was evaporated under reduced pressure and the residue was distilled to obtain 58.5 g. (83% yield) of 4-(2-methylpropenyl) morpholine as a colorless oil boiling at 60 to 63° C. (14–15 mm.)

PREPARATION 2

Following the procedure of Preparation 1, but replacing isobutyraldehyde with 2-ethyloctaldehyde, 2,3-dimethylbutyraldehyde, 2-methylheptaldehyde, 2-butylhexaldehyde, 2-butyloctaldehyde, 2-hexyloctaldehyde, diphenylacetaldehyde, 2-phenylpropionaldehyde, 3-methyl-2-phenylbutyraldehyde, and 2-phenyloctaldehyde, there were prepared 4-(2-ethyl-1-octenyl)morpholine, 4-(2,3-dimethyl-1-butenyl)morpholine, 4-(2-methyl-1-heptenyl) morpholine, 4-(2-butyl - 1 - hexenyl)morpholine, 4-(2-hexyl-1-octenyl)morpholine, 4- (2- hexyl-1-octenyl)morpholine, 4-(2-phenylstyryl)morpholine, 4 - (2-phenylpropenyl)morpholine, 4 - (3-methyl-2-phenyl-1-butenyl) morpholine, and 4-(2-phenyl-1-octenyl)morpholine, respectively.

PREPARATION 3

Following the procedure of Preparation 1, but replacing morpholine with diisopropylamine, diisobutylamine, dihexylamine, p-isopropyl-N-tert.pentylaniline, N-butyl-o-chloroaniline, N-methyl-m-toluidine, N-ethyl-3,5-xylidine, N,3-dimethylbutylamine, thiamorpholine, N-isopropylhexylamine, N-isopropyl-p-anisidine, N-ethylaniline, N-hexylaniline, and N-ethyl-2-methylpropylamine, there were prepared N,N-diisopropyl-(2-methylpropenyl) amine, N - (2 - methylpropenyl)diisobutylamine, N-(2-methylpropenyl)dihexylamine, p-isopropyl-N-(2-methylpropenyl)-N-tert.pentylaniline, N - butyl-o-chloro-N-(2-methylpropenyl)aniline, N-methyl-N-(2-methylpropenyl)-m-toluidine, N-ethyl-N-(2-methylpropenyl)-3,5-xylidine, N,3-dimethyl - N - (2-methylpropenyl)butylamine, 4-(2-methylpropenyl)thiamorpholine, N - isopropyl - N - (2-methylpropenyl)hexylamine, N - isopropyl-N-(2-methylpropenyl)-o-anisidine, N-ethyl-N-(2-methylpropenyl)aniline, N-hexyl-N-(2-methylpropenyl)aniline, and N-ethyl-2-methyl-N-(2-methylpropenyl)propylamine.

The following examples are illustrative of the process and products of the present invention, but are not to be construed as limiting.

EXAMPLE 1.—(1,1-DIMETHYL-2-PIPERIDINO-ETHYL)HYDROQUINONE

Part A.—2,3-dihydro-3,3-dimethyl-2-piperidino-5-benzofuranol

A solution of 43 g. (0.31 mole) of 1-(2 methylpropenyl) - piperidine in 100 ml. of benzene was added to a solution of 32.5 g. (0.30 mole) of p-benzoquinone in 300 ml. of benzene. The spontaneous exothermic reaction which accompanied the mixing increase the temperature and the mixture darkened. As the reaction mixture cooled, brown crystals began to appear as the temperature approached 25° C. After setting the mixture aside at about 25° C. for 2 days, the brown crystals were collected on a filter, and recrystallized from benzene. There was thus obtained 51 g. (69% yield) of 2,3-dihydro-3,3-dimethyl-2-piperidino-5-benzofuranol having a melting point of 157° to 158° C. A cream-colored analytical sample was obtained by recrystallization from a mixture of benzene and technical hexane (Skellysolve B, a mixture of isomeric hexanes having a boiling range of 140° to 160° F.). The melting point was 159° to 160° C.

*Analysis.*—Calcd. for $C_{15}H_{21}NO_2$: C, 72.84; H, 8.56; N, 5.66. Found: C, 72.83; H, 8.29; N, 5.37.

*Part B.—(1,1-dimethyl-2-piperidinoethyl)hydroquinone*

A 25 g. sample of 2,3-dihydro-3,3-dimethyl-2-piperidino-5-benezofuranol (prepared in Part A, above) was dissolved in 150 ml. of glacial acetic acid and hydrogenolyzed in the presence of 1 g. of platinum oxide catalyst and hydrogen at 30 to 40 p.s.i. The theoretical amount of hydrogen was absorbed in about 2 hrs. The catalyst was removed by filtration, and after concentrating the filtrate by evaporating the solvent under reduced pressure, the residue was made alkaline with aqueous sodium carbonate solution. A solid that separated was recovered on a filter; and the filter cake was washed with water and recrystallized from ethanol to give 17.5 g. 70% yield) of (1,1-dimethyl-2-piperidinoethyl)hydroquinone having a melting point of 221° to 225° C. (with decomposition). After two recrystallizations from ethanol and one recrystallization from methanol the compound was obtained as a white solid having a melting point of 218° to 220° C.

*Analysis.*—Calcd. for $C_{15}H_{23}NO_2$: C, 72.25; H, 9.30; N, 5.62. Found: C, 71.91; H, 9.15; N, 5.77.

EXAMPLE 2.—[1,1-DIMETHYL-2-(4-METHYL-1-PIPERAZINYL)ETHYL]HYDROQUINONE

*Part A.—2,3-dihydro-3,3-dimethyl-2-(4methyl-1-piperazinyl)-5-benzofuranol*

A solution of 38 g. (0.35 mole) of p-benzoquinone and 55.5 g. (0.36 mole) of 1-(2-methylpropenyl)-4-methylpiperazine in 600 ml. of benzene was set aside at about 25° C. for 24 hrs. A brown solid that separated was collected on a filter and the filter cake was washed with technical hexane. There was thus obtained 63 g. (68.5% yield) of 2,3-dihydro-3,3-dimethyl-2-(4-methyl-1-piperazinyl)-5-benzufuranol having a melting point of 184° to 186° C. After two recrystallizations from ethyl acetate the compound had a melting point of 195° C.

*Analysis.*—Calcd. for $C_{15}H_{22}N_2O_2$: C, 68.87; H, 8.45; N, 10.68. Found: C, 68.42; H, 8.36; N, 10.72.

*Part B.—[1,1-dimethyl-2-(4-methyl-1-piperazinyl)ethyl]hydroquinone*

A 10 g. sample of 2,3-dihydro-3,3-dimethyl-2-(4-methyl-1-piperazinyl)-5-benzofuranol (prepared in Part A, above) was dissolved in 150 ml. of glacial acetic acid and hydrogenolyzed in the presence of 1 g. of plantinum oxide catalyst and hydrogen at 40 p.s.i. pressure. After 2 hrs., the theoretical amount of hydrogen had been absorbed and the pressure in the hydrogenator had decreased to 27 p.s.i. The catalyst was removed from the reaction mixture by filtration, and the filtrate was concentrated by evaporating the acetic acid under reduced pressure. The residue thus obtained was made alkaline with aqueous sodium bicarbonate solution and then extracted with ether several times. The ether extracts were combined, washed with water, and dried over anhydrous magnesium sulfate. After removing the ether by evaporation a white solid remained which after recrystallization from a mixture of benzene and technical hexane gave 5.8 g. (68% yield) of [1,1-dimethyl-2-(4-methyl-1-piperazinyl)ethyl]-hydroquinone having a melting point of 159° to 160° C. Two further recrystallizations from benzene did not change the melting point.

*Analysis.*—Calcd. for $C_{15}H_{24}N_2O_2$: C, 68.15; H, 9.15; N, 10.60. Found: C, 68.59; H, 9.26; N, 10.38.

EXAMPLE 3.—(1,1-DIMETHYL-2-MORPHOLINOETHYL)HYDROQUINONE

*Part A.—2,3-dihydro-3,3-dimethyl-2-morpholino-5-benzofuranol*

A solution of 10.5 g. (0.098 mole) of p-benzoquinone and 14.0 g. (0.1 mole) of 4-(2-methylpropenyl)morpholine in 250 ml. of benzene was set aside at about 25° C. for 3 days. A red solid that separated was collected on a filter, and the filter cake was triturated with hot methylene chloride. After again collecting the solid on a filter, it was recrystallized two times from ethyl acetate to give 4.8 g. of 2,3-dihydro-3,3-dimethyl-2-morpholino-5-benzofuranol having a melting point of 187° to 189° C. An analytical sample obtained by recrystallization from ethyl acetate had a melting point of 187° to 188° C.

*Analysis.*—Calcd. for $C_{14}H_{19}NO_3$: C, 67.44; H, 7.68; N, 5.62. Found: C, 67.74; H, 7.83; N, 5.58.

*Part B.—(1,1-dimethyl-2-morpholinoethyl)hydroquinone*

Following the procedure of Example 1, Part B, but substituting 2,3-dihydro-3,3-dimethyl-2-morpholino-5-benzofuranol for 2,3-dihydro-3,3-dimethyl-2-piperidino-5-benzofuranol, there was prepared (1,1-dimethyl-2-morpholinoethyl)hydroquinone.

EXAMPLE 4.—[1,1-DIMETHYL-2-(1-PYRROLIDINYL)ETHYL]HYDROQUINONE

*Part A.—2,3-dihydro-3,3-dimethyl-2-(1-pyrrolidinyl)-5-benezofuranol*

A solution of 10.5 g. (0.098 mole) of p-benzoquinone and 12.5 g. (0.1 mole) of 1-(2-methylpropenyl)pyrrolidine in 250 ml. of benzene was set aside at about 25° C. for 24 hrs. A precipitate that formed was collected on a filter, and recrystallized two times from ethyl acetate. There was thus obtained 8.6 g. of 2,3-dihydro-3,3-dimethyl-2-(1-pyrrolidinyl)-5-benzofuranol having a melting point of 154° to 155° C. After a third recrystallization from ethyl acetate an analytical sample melting at 154° C. was obtained.

*Analysis.*—Calcd. for $C_{14}H_{19}NO_2$: C, 72.07; H, 8.21; N, 6.00. Found: C, 72.07; H, 8.21; N, 5.72.

*Part B.—[1,1-dimethyl-2-(1-pyrrolidinyl)ethyl]hydroquinone*

Following the same procedure of Example 1, Part B, but substituting 2,3-dihydro-3,3-dimethyl-2-(1-pyrrolidinyl)-5-benzofuranol for 2,3-dihydro-3,3-dimethyl-2-piperidino-5-benzofuranol, there was prepared [1,1-dimethyl-2-(1-pyrrolidinyl)ethyl]hydroquinone.

EXAMPLE 5.—[1,1-DIMETHYL-2-(HEXAHYDRO-1H-AZEPIN-1-YL)ETHYL]-HYDROQUINONE

*Part A.—2,3-dihydro-3,3-dimethyl-2-(hexahydro-1H-azepin-1-yl)-5-benzofuranol hydrochloride*

A solution of 38 g. (0.35 mole) of p-benzoquinone and 56 g. (0.365 mole) of 1-(2-methylpropenyl)hexamethylenimine in 600 ml. of benzene was set aside at about 25° C. for 24 hrs. The reaction mixture was concentrated by evaporating the benzene under reduced pressure, and the residue thus obtained was dissolved in ether. The ether solution was treated with ethereal hydrogen chloride and a precipitate formed. The precipitate was collected on a filter, triturated with a hot mixture of isopropyl alcohol and ether, and again recovered on a filter. The filter cake was recrystallized from a mixture of ethanol and ether to give 74.5 g. (70% yield) of 2,3-dihydro-3,3-dimethyl-2-(hexahydro-1H-azepin-1-yl)-5-benzofuranol hydrochloride having a melting point of 222° to 226° C. Another recrystallization from a mixture of methanol and ether gave an analytical sample melting at 227° to 229° C.

*Analysis.*—Calcd. for $C_{16}H_{23}NO_2 \cdot HCl$: C, 64.52; H, 8.12; N, 4.70. Found: C, 64.28; H, 8.24; N, 4.77.

*Part B.—[1,1-dimethyl-2-(hexahydro-1H-azepin-1-yl)ethyl]hydroquinone*

Following the procedure of Example 1, Part B, but substituting 2,3-dihydro-3,3-dimethyl-2-(hexahydro-1H-azepin-1-yl)-5-benzofuranol (prepared by neutralizing a portion of the hydrochloride prepared in Part A, above, with an equimolar amount of base) for 2,3-dihydro-3,3-dimethyl-2-piperidino-5-benzofuranol, there was prepared [1,1 - dimethyl-2-(hexahydro-1H-azepin-1-yl)ethyl]hydroquinone.

EXAMPLE 6.—(1-ISOPROPYL-2-PIPERIDINOETHYL)HYDROQUINONE

*Part A.—2,3-dihydro-3-isopropyl-2-piperidino-5-benzofuranol*

A solution of 21.5 g. (0.2 mole) of p-benzoquinone and 30.5 g. (0.2 mole) of 1-(3-methyl-1-butenyl)piperidine in 400 ml. of benzene was set aside at about 25° C. for 3 days. A brown solid that separated was collected on a filter and recrystallized from a mixture of benzene and technical hexane to give 28 g. (54% yield) of 2,3-dihydro-3-isopropyl-2-piperidino-5-benzofuranol having a melting point of 152° to 158° C. Two recrystallizations from benzene gave an analytical sample melting at 156° to 158° C.

*Analysis.*—Calcd. for $C_{16}H_{23}NO_2$: C, 73.53; H, 8.87; N, 5.36. Found: C, 73.43; H, 8.90; N, 5.28.

*Part B.—(1-isopropyl-2-piperidinoethyl)hydroquinone*

Following the procedure of Example 1, Part B, but substituting 2,3-dihydro-3-isopropyl-2-piperidino-5-benzofuranol for 2,3-dihydro-3,3-dimethyl-2-piperidino-5-benzofuranol, there was prepared (1-isopropyl-2-piperidinoethyl)hydroquinone.

EXAMPLE 7.—(1-PHENYL-2-PIPERIDINOETHYL) HYDROQUINONE

*Part A.—2,3-dihydro-3-phenyl-2-piperidino-5-benzofuranol hydrochloride*

A reaction mixture consisting of 5.4 g. (0.05 mole) of p-benzoquinone and 9.5 g. (0.05 mole) of 1-styrylpiperidine in 100 ml. of ethyl acetate was set aside at about 25° C. for 24 hrs. The mixture was then concentrated by evaporating the solvent under reduced pressure. The residue thus obtained was dissolved in ether and the ether solution was treated with ethereal hydrogen chloride. A precipitate that formed was collected on a filter and recrystallized from absolute ethanol to give 3.9 g. of 2,3-dihydro-3-phenyl-2-piperidino-5-benzofuranol hydrochloride having a melting point of 222° to 225° C. [with decomposition (yellowing) at 215° C.]. The compound was recrystallized three times from a mixture of methanol and ether, and it had a melting point of 222° to 224° C. (with decomposition).

*Analysis.*—Calcd. for $C_{19}H_{21}NO_2 \cdot HCl$: C, 68.76; H, 6.68; N, 4.22. Found: C, 68.48; H, 6.83; N, 4.11.

*Part B.—(1-phenyl-2-piperidinoethyl)hydroquinone*

Following the procedure of Example 1, Part B, but substituting 2,3-dihydro - 3 - phenyl-2-piperidino-5-benzofuranol (prepared by neutralizing a portion of the hydrochloride prepared in Part A, above with an equimolar amount of base) for 2,3-dihydro-3,3-dimethyl-2-piperidino-5-benzofuranol, there was obtained (1-phenyl-2-piperidinoethyl)hydroquinone.

EXAMPLE 8.—(1-ETHYL-2-PIPERIDINOETHYL) HYDROQUINONE

*Part A.—2,3-dihydro-3-ethyl-2-piperidino-5-benzofuranol*

A solution of 10.8 g. (0.1 mole) of p-benzoquinone and 14.0 g. (0.1 mole) of 1-(1-butenyl)piperidine in 250 ml. of benzene was set aside at about 25° C. for about 20 hrs. The solid that had separated was collected on a filter and recrystallized from ethyl acetate using an activated carbon for decolorization. There was thus obtained 8.9 g. of 2,3-dihydro-3-ethyl-2-piperidino-5-benzofuranol having a melting point of 175° to 184° C. After two more recrystallizations from ethyl acetate the compound was obtained as a pinkish-white solid having a melting point of 176° to 183° C.

*Analysis.*—Calcd. for $C_{15}H_{21}NO_2$: C, 72.84; H, 8.56; N, 5.66. Found: C, 72.69; H, 8.96; N, 5.50.

*Part B.—(1-ethyl-2-piperidinoethyl)hydroquinone*

Following the procedure of Example 1, Part B, but substituting 2,3-dihydro-3-ethyl-2-piperidino-5-benzofuranol for 2,3-dihydro-3,3-dimethyl-2-piperidino-5-benzofuranol, there was obtained (1-ethyl-2-piperidinoethyl)hydroquinone.

EXAMPLE 9

Following the procedure of Example 1, Part A, but replacing 1-(2-methylpropenyl)piperidine with 4-(2-ethyl-1-octenyl)morpholine,
4-(2,3-dimethyl-1-butenyl)morpholine,
4-(2-methyl-1-heptenyl)morpholine,
4-(2-butyl-1-hexenyl)morpholine,
4-(2-butyl-1-octenyl)morpholine,
4-(2-hexyl-1-octenyl)morpholine,
4-(2-phenylstyryl)morpholine,
4-(2-phenylpropenyl)morpholine,
4-(3-methyl-2-phenyl-1-butenyl)morpholine,
4-(2-phenyl-1-octenyl)morpholine,
1-propenylpiperidine,
1-(1-heptenyl)piperidine,
N,N-diethyl-1-heptenylamine,
N-1-butenyl-N-methylaniline,
N,N-diethylstyrylamine,
1-propenylpyrrolidine,
N,N-diethyl-1-butenylamine,
1-(2-ethyl-1-butenyl)piperidine,
N,N-diethyl-2-methylpropenylamine,
4-(1-heptenyl)morpholine,
1-(2-ethyl-1-hexenyl)piperidine,
N,N-2-trimethylpropenylamine,
N,N-diisopropyl-(2-methylpropenyl)amine,
N-(2-methylpropenyl)diisobutylamine,
N-(2-methylpropenyl)dihexylamine,
p-isopropyl-N-(2-methylpropenyl)-N-tert.pentylaniline,
N-butyl-o-chloro-N-(2-methylpropenyl)aniline,
N-methyl-N-(2-methylpropenyl)-m-toluidine,
N-ethyl-N-(2-methylpropenyl)-3,5-xylidine,
N,3-dimethyl-N-(2-methylpropenyl)butylamine,
4-(2-methylpropenyl)thiamorpholine,
N-isopropyl-N-(2-methylpropenyl)hexylamine,
N-isopropyl-N-(2-methylpropenyl)-o-anisidine,
N-ethyl-N-(2-methylpropenyl)aniline,
N-hexyl-N-(2-methylpropenyl)aniline, and
N-ethyl-N-(2-methylpropyl)-2-methylpropenylamine,
there were prepared
2,3-dihydro-3-ethyl-3-hexyl-2-morpholino-5-benzofuranol,
2,3-dihydro-3-methyl-3-isopropyl-2-morpholino-5-benzofuranol,
2,3-dihydro-3-methyl-3-pentyl-2-morpholino-5-benzofuranol,
2,3-dihydro-3,3-dibutyl-2-morpholino-5-benzofuranol,
2,3-dihydro-3-butyl-3-hexyl-2-morpholino-5-benzofuranol,
2,3-dihydro-3,3-dihexyl-2-morpholino-5-benzofuranol,
2,3-dihydro-3,3-diphenyl-2-morpholino-5-benzofuranol,
2,3-dihydro-3-methyl-3-phenyl-2-morpholino-5-benzofuranol,
2,3-dihydro-3-isopropyl-3-phenyl-2-morpholino-5-benzofuranol,
2,3-dihydro-3-hexyl-3-phenyl-2-morpholino-5-benzofuranol,
2,3-dihydro-3-methyl-3-piperidino-5-benzofuranol,
2,3-dihydro-3-pentyl-2-piperidino-5-benzofuranol,
2,3-dihydro-3-pentyl-2-diethylamino-5-benzofuranol,
2,3-dihydro-3-ethyl-2-(N-methylanilino)-5-benzofuranol,
2,3-dihydro-3-phenyl-2-diethylamino-5-benzofuranol,
2,3-dihydro-3-methyl-2-(1-pyrrolidinyl)-5-benzofuranol, 2,3-dihydro-3-ethyl-2-diethylamino-5-benzofuranol,
2,3-dihydro-3,3-dimethyl-2-diethylamino-5-benzofuranol,
2,3-dihydro-3,3-diethyl-2-piperidino-5-benzofuranol,
2,3-dihydro-3-pentyl-2-morpholino-5-benzofuranol,
2,3-dihydro-3-butyl-2-ethyl-2-piperidino-5-benzofuranol,
2,3-dihydro-3,3-dimethyl-2-dimethylamino-5-benzofuranol,
2,3-dihydro-3,3-dimethyl-2-diisopropylamino-5-benzofuranol,
2,3-dihydro-3,3-dimethyl-2-diisobutylamino-5-benzofuranol,
2,3-dihydro-3,3-dimethyl-2-dihexylamino-5-benzofuranol,
2,3-dihydro-3,3-dimethyl-2-(p-isopropyl-N-tert.-pentylanilino)-5-benzofuranol,
2,3-dihydro-3,3-dimethyl-2-(o-chloro-N-butylanilino)-5-benzofuranol,
2,3-dihydro-3,3-dimethyl-2-(N-methyl-m-toluidino)-5-benzofuranol,
2,3-dihydro-3,3-dimethyl-2-(N-methyl-3,5-xylidino)-5-benzofuranol,
2,3-dihydro-3,3-dimethyl-2-(N,3-dimethylbutylamino)-5-benzofuranol,
2,3-dihydro-3,3-dimethyl-2-thiamorpholino-5-benzofuranol,
2,3-dihydro-3,3-dimethyl-2-(N-isopropylhexylamino)-5-benzofuranol,
2,3-dihydro-3,3-dimethyl-2-(N-isopropyl-o-anisidino)-5-benzofuranol,
2,3-dihydro-3,3-dimethyl-2-(N-ethylanilino)-5-benzofuranol,
2,3-dihydro-3,3-dimethyl-2-(N-hexylanilino)-5-benzofuranol, and
2,3-dihydro-3,3-dimethyl-2-(N-ethyl-2-methylpropylamino)-5-benzofuranol, respectively.

EXAMPLE 10

Following the procedure of Example 1, Part B, but substituting
2,3-dihydro-3-methyl-2-piperidino-5-benzofuranol,
2,3-dihydro-3-pentyl-2-piperidino-5-benzofuranol,
2,3-dihydro-3-pentyl-2-diethylamino-5-benzofuranol,
2,3-dihydro-3-ethyl-2-(N-methylanilino)-5-benzofuranol,
2,3-dihydro-3-phenyl-2-diethylamino-5-benzofuranol,
2,3-dihydro-3-methyl-2-(1-pyrrolidinyl)-5-benzofuranol,
2,3-dihydro-3,3-dimethyl-2-diethylamino-5-benzofuranol,
2,3-dihydro-3,3-diethyl-2-piperidino-5-benzofuranol,
2,3-dihydro-3-ethyl-2-diethylamino-5-benzofuranol,
2,3-dihydro-3-pentyl-2-morpholino-5-benzofuranol,
2,3-dihydro-3-butyl-3-ethyl-2-piperidino-5-benzofuranol,
2,3-dihyrdo-3-ethyl-3-hexyl-2-morpholino-5-benzofuranol,
2,3-dihydro-3-methyl-3-isopropyl-2-morpholino-5-benzofuranol,
2,3-dihydro-3-methyl-3-pentyl-2-morpholino-5-benzofuranol,
2,3-dihydro-3,3-dibutyl-2-morpholino-5-benzofuranol,
2,3-dihydro-3-butyl-3-hexyl-2-morpholino-5-benzofuranol,
2,3-dihydro-3,3-dihexyl-2-morpholino-5-benzofuranol,
2,3-dihydro-3,3-diphenyl-2-morpholino-5-benzofuranol,
2,3-dihydro-3-methyl-3-phenyl-2-morpholino-5-benzofuranol,
2,3-dihydro-3-isopropyl-3-phenyl-2-morpholino-5-benzofuranol,
2,3-dihydro-3-hexyl-3-phenyl-2-morpholino-5-benzofuranol,
2,3-dihydro-3,3-dimethyl-2-dimethylamino-5-benzofuranol,
2,3-dihydro-3,3-dimethyl-2-diisopropylamino-5-benzofuranol,
2,3-dihydro-3,3-dimethyl-2-diisobutylamino-5-benzofuranol,
2,3-dihydro-3,3-dimethyl-2-dihexylamino-5-benzofuranol,
2,3-dihydro-3,3-dimethyl-2-(p-isopropyl-N-tert. pentylanilino)-5-benzofuranol,
2,3-dihydro-3,3-dimethyl-2-(o-chloro-N-butylanilino)-5-benzofuranol,
2,3-dihydro-3,3-dimethyl-2-(N-methyl-o-toluidino)-5-benzofuranol,
2,3-dihydro3,3-dimethyl-2-(N-ethyl-3,5-xylidino)-5-benzofuranol,
2,3-dihydro-3,3-dimethyl-2-(N,3-dimethylbutylamino)-5-benzofuranol,
2,3-dihydro-3,3-dimethyl-2-thiamorpholino-5-benzofuranol,
2,3-dihydro-3,3-dimethyl-2-(N-isopropylhexyamino)-5-benzofuranol,
2,3-dihydro-3,3-dimethyl-2-(N-isopropyl-o-anisidino)-5-benzofuranol,
2,3-dihydro-3,3-dimethyl-2-(N-ethylanilino)-5-benzofuranol,
2,3-dihydro-3,3-dimethyl-2-(N-hexylanilino)-5-benzofuranol,
and 2,3-dihydro-3,3-dimethyl-2-(N-ethyl-2-methylpropylamino)-5-benzofuranol for 2,3-dihydro-3,3-dimethyl-2-piperidino-5-benzofuranol,
there were prepared (1-methyl-2-piperidinoethyl)-hydroquinone,
(1-pentyl-2-piperidinoethyl)hydroquinone,
(1-pentyl-2-diethylaminoethyl)hydroquinone,
[1-ethyl-2-(N-methylanilino)ethyl]hydroquinone,
(1-phenyl-2-diethylaminoethyl)-hydroquinone,
[1-methyl-2-(1-pyrrolidinyl)ethyl]hydroquinone,
(1,1-dimethyl-2-diethylaminoethyl)hydroquinone,
(1,1-diethyl-2-piperidinoethyl)hydroquinone,
(1-ethyl-2-diethylaminoethyl)-hydroquinone,
(1-pentyl-2-morpholinoethyl)hydroquinone,
(1-butyl-1-ethyl-2-piperidinoethyl)hydroquinone,
(1-ethyl-1-hexyl-2-morpholinoethyl)hydroquinone,
(1-methyl-1-isopropyl-2-morpholinoethyl)hydroquinone,
(1-methyl-1-pentyl-2-morpholinoethyl)-hydroquinone,
(1,1-dibutyl-2-morpholinoethyl)hydroquinone,
(1-butyl-1-hexyl-2-morpholinoethyl)hydroquinone,
(1,1-dihexyl-2-morpholinoethyl)hydroquinone,
(1,1-diphenyl-2-morpholinoethyl)hydroquinone,
(1-methyl-1-phenyl-2-morpholinoethyl)hydroquinone,
(1-isopropyl-1-phenyl-2-morpholinoethyl)hydroquinone,
(1-hexyl-1-phenyl-2-morpholinoethyl)hydroquinone,
(1,1-dimethyl-2-dimethylaminoethyl)hydroquinone,
(1,1-dimethyl-2-diisopropylaminoethyl)hydroquinone,
(1,1-dimethyl-2-diisobutylaminoethyl)hydroquinone,
(1,1-dimethyl-2-dihexylaminoethyl)hydroquinone,
[1,1-dimethyl-2-(p-isopropyl-N-tert.pentylanilino)ethyl]-hydroquinone,
[1,1-dimethyl-2-(o-chloro-N-butylanilino)ethyl]-hydroquinone,
[1,1-dimethyl-2-(N-methyl-o-toluidino)ethyl]-hydroquinone,
[1,1-dimethyl-2-(N-ethyl-3,5-xylidino)ethyl]-hydroquinone,
[1,1-dimethyl-2-(N-3,-dimethylbutylamino)ethyl]-hydroquinone,
(1,1-dimethyl-2-thiamorpholinoethyl)hydroquinone,
[1,1-dimethyl-2-(N-isopropylhexyamino)ethyl]hydroquinone,
[1,1-dimethyl-2-(N-isopropyl-o-anisidino)ethyl]hydroquinone,
[1,1-dimethyl-2-(N-ethylanilino)ethyl]hydroquinone,
[1,1-dimethyl-2-(N-hexylanilino)ethyl]hydroquinone,
and [1,1-dimethyl-2-(N-ethyl-2-methylpropylamino)ethyl]hydroquinone, respectively.

EXAMPLE 11.—PREPARATION OF (1,1-DIMETHYL - 2 - PIPERIDINOETHYL)HYDROQUINONE DIACETATE

A solution consisting of 2 g. of (1,1-dimethyl-2-piperidinoethyl)hydroquinone (Example 1, Part B) in 30 ml. of acetic anhydride was heated at the reflux temperature for 1 hr., and the reaction mixture was poured into ice-water. After standing for several hours, the aqueous mixture was basified with aqueous sodium carbonate solution and extracted with methylene chloride. The organic layer was separated, washed with water, dried, and concentrated under reduced pressure. The white solid thus obtained was recrystallized two times from a mixture of ether and technical hexane to give (1,1-dimethyl-2-piperidinoethyl)hydroquinone diacetate.

Following the same procedure, but substituting propionic anhydride, butyric anhydride, valeric anhydride, acetic formic anhydride, and caproic anhydride for acetic anhydride, there were prepared (1,1-dimethyl-2-piperidinoethyl)hydroquinone dipropionate, (1,1-dimethyl-2-piperidinoethyl)hydroquinone dibutyrate, (1,1-dimethyl-2-piperidinoethyl)hydroquinone divalerate, (1,1-dimethyl-2-piperidinoethyl)hydroquinone diformate, and (1,1-dimethyl-2-piperidinoethyl)hydroquinone dicaproate, respectively.

EXAMPLE 12

To an ethanolic solution of (1,1-dimethyl-2-piperidinoethyl)hydroquinone (Example 1, Part B) is added an ethanolic solution of 1 equivalent of hydrogen chloride. The mixture is evaporated to dryness below about 30° C. to obtain (1,1-dimethyl-2-piperidinoethyl)hydroquinone hydrochloride.

Following the same procedure, but substituting [1,1-dimethyl - 2 - (4 - methyl - 1 - piperazinyl)ethyl]hydroquinone (Example 2, Part B) for (1,1-dimethyl-2-piperidinoethyl)hydroquinone, and using 2 equivalents of hydrogen chloride, there is obtained [1,1-dimethyl-2-(4-methyl - 1 - piperazinyl)ethyl]hydroquinone dihydrochloride.

Following the same procedure, but substituting for hydrogen chloride other pharmacologically acceptable acids, e.g., those given above, there are obtained the sulfates, hydrobromides, nitrates, phosphates, benzoates, p-toluenesulfonates, salicylates, acetates, propionates, pamoates, tratrates, citrates, and succinates of (1,1-dimethyl - 2 - piperidinoethyl)hydroquinone and [1,1-dimethyl - 2 - (4 - methyl - 1 - piperazinyl)ethyl]hydroquinone.

Following the same procedure, but replacing (1,1-dimethyl-2-piperidinoethyl)hydroquinone and [1,1-dimethyl - 2 - (4 - methyl - 1 - piperazinyl)ethyl]hydroquinone with each of the free bases disclosed in Examples 3 through 11, there are obtained the hydrochlorides, sulfates, hydrobromides, nitrates, phosphates, benzoates, p-toluenesulfonates, salicylates, acetates, propionates, pamoates, tartrates, citrates, and succinates of said bases.

I claim:
1. The process which comprises hydrogenolysis of a 2 - amino - 2,3 - dihydro - 3 - substituted - 5 - benzofuranol of the formula

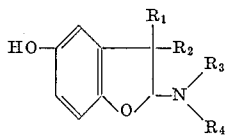

wherein $R_1$ is selected from the group consisting of hydrogen, lower-alkyl, and phenyl; $R_2$ is selected from the group consisting of lower-alkyl and phenyl; $R_3$ and $R_4$ taken separately are selected from the group consisting of lower-alkyl, phenyl, and substituted phenyl selected from the group consisting of lower-alkylphenyl, lower-alkoxyphenyl, and halophenyl, provided that $R_3$ and $R_4$ are not simultaneously selected from phenyl and substituted phenyl; and $R_3$ and $R_4$ taken together with —N< constitute a saturated heterocyclic amino radical selected from the group consisting of pyrrolidino, 2-methylpyrrolidino, 2-ethylpyrrolidino, 2,2-dimethylpyrrolidino, 3,4-dimethylpyrrolidino, 2-isopropylpyrrolidino, 2-sec-butylpyrrolidino, morpholino, 2-ethylmorpholino, 2-ethyl-5-methylmorpholino, 3,3-dimethylmorpholino, thiamorpholino, 3-methylmorpholino, 2,3,6 - trimethylmorpholino, 4 - methylpiperazino, 4 - butylpiperazino, piperidino, 2-methylpiperidino, 3 - methylpiperidino, 4 - methylpiperidino, 4 - propylpiperidino, 2 - propylpiperidino, 4-isopropylpiperidino, hexamethyleneimino, 2 - methylhexamethyleneimino, 3,6 - dimethylhexamethyleneimino, and homomorpholino to produce a compound of the formula

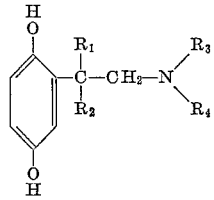

wherein $R_1$, $R_2$, $R_3$, and $R_4$ are as defined above.

2. The process according to claim 1 wherein hydrogenolysis is effected with a noble metal catalyst.
3. Process according to claim 4 wherein the catalyst is platinum.
4. A compound selected from the group consisting of (1) (2-aminoethyl)hydroquinone of the formula

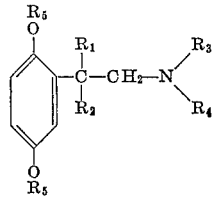

wherein $R_5$ is selected from the group consisting of hydrogen and lower-alkanoyl; $R_1$ is selected from the group consisting of hydrogen, lower-alkyl, and phenyl; $R_2$ is selected from the group consisting of lower-alkyl and phenyl; $R_3$ and $R_4$ taken separately are selected from the group consisting of lower-alkyl, phenyl, and substituted phenyl selected from the group consisting of lower-alkylphenyl, lower-alkoxyphenyl, and halophenyl, provided that $R_3$ and $R_4$ are not simultaneously selected from phenyl and substituted phenyl; and $R_3$ and $R_4$ taken together with —N< constitute a saturated heterocyclic amino radical selected from the group consisting of pyrrolidino, 2-methylpyrrolidino, 2-ethylpyrrolidino, 2,2-dimethylpyrrolidino, 3,4 - dimethylpyrrolidino, 2 - isopropylpyrrolidino, 2 - sec - butylpyrrolidino, morpholino, 2 - ethylmorpholino, 2 - ethyl - 5 - methylmorpholino, 3,3 - dimethylmorpholino, thiamorpholino, 3-methylmorpholino, 2,3,6-trimethylmorpholino, 4 - methylpiperazino, 4 - butylpiperazino, piperidino, 2 - methylpiperidino, 3 - methylpiperidino, 4 - methylpiperidino, 4-propylpiperidino, 2 - propylpiperidino, 4 - isopropylpiperidino, hexamethyleneimino, 2 - methylhexamethyleneimino, 3,6-dimethylhexamethyleneimino, and homomorpholino and (2) acid addition salts thereof.

5. (1,1-dimethyl-2-piperidinoethyl)hydroquinone.
6. [1,1 - dimethyl-2-(4-methyl-1-piperazino)ethyl]hydroquinone.

References Cited by the Examiner
UNITED STATES PATENTS
3,184,457   5/1965   Brannock et al. ___ 260—346.2

ALEX MAZEL, *Primary Examiner.*
JOSE TOVAR, *Assistant Examiner.*